(12) United States Patent
Tanimichi (10) Patent No.: US 8,423,254 B2
(45) Date of Patent: Apr. 16, 2013

(54) CONTROL DEVICE FOR AUTOMOBILE

(75) Inventor: Taisetsu Tanimichi, Mito (JP)

(73) Assignee: Hitachi, Ltd., Tokyo (JP)

( * ) Notice: Subject to any disclaimer, the term of this patent is extended or adjusted under 35 U.S.C. 154(b) by 298 days.

(21) Appl. No.: 11/667,261

(22) PCT Filed: Nov. 29, 2004

(86) PCT No.: PCT/JP2004/018084
§ 371 (c)(1),
(2), (4) Date: May 8, 2007

(87) PCT Pub. No.: WO2006/057070
PCT Pub. Date: Jun. 1, 2006

(65) Prior Publication Data
US 2007/0250241 A1    Oct. 25, 2007

(51) Int. Cl.
| G06F 7/70 | (2006.01) |
| G06F 19/00 | (2006.01) |
| G06F 17/10 | (2006.01) |
| G06G 7/00 | (2006.01) |
| G06G 7/76 | (2006.01) |
| G06G 7/78 | (2006.01) |
| G08G 1/16 | (2006.01) |

(52) U.S. Cl.
USPC ................................ 701/70; 701/301

(58) Field of Classification Search ............... 701/70, 701/96, 116–119, 121, 300, 301
See application file for complete search history.

(56) References Cited

U.S. PATENT DOCUMENTS

| 5,854,987 | A | * | 12/1998 | Sekine et al. | ................. 701/41 |
| 6,056,374 | A | * | 5/2000 | Hiwatashi | ................. 303/193 |
| 6,169,478 | B1 | | 1/2001 | Hada et al. | |
| 6,859,716 | B2 | * | 2/2005 | Kikuchi | ................. 701/96 |
| 2003/0217880 | A1 | * | 11/2003 | Isogai et al. | ................. 180/170 |
| 2004/0030497 | A1 | * | 2/2004 | Knoop et al. | ................. 701/301 |
| 2005/0004762 | A1 | * | 1/2005 | Takahama et al. | ............ 701/301 |

FOREIGN PATENT DOCUMENTS

| DE | 198 56 823 A1 | 6/1999 |
| GB | 2 309 555 A | 7/1997 |

(Continued)

OTHER PUBLICATIONS

Supplementary European Office Action dated Aug. 17, 2010 (three (3) pages).

*Primary Examiner* — Thomas Tarcza
*Assistant Examiner* — Imran Mustafa
(74) *Attorney, Agent, or Firm* — Crowell & Moring LLP (57) ABSTRACT

The proposed automatic deceleration device includes a recognizing section for recognizing the driving environment; a first target deceleration calculating section for obtaining the target deceleration depending on the recognized driving environment; a second target deceleration calculating section for obtaining the target deceleration
  irrespective of the driving environment; and a changeover section for switching between the deceleration obtained depending on the driving environment and the
  deceleration obtained irrespective of the driving environment on the basis of the vehicle information including the recognized driving environment. According to the proposed automatic deceleration device, the driver's vehicle can be decelerated even
when the recognition section for recognizing the driving environment fails to detect an obstacle existing ahead of the driver's vehicle, and further the occurrence of a dangerous situation that may result from the driver's delayed application of the brake can be prevented even when the recognition section fails to detect such an obstacle contrary to the driver's false conviction that the vehicle is automatically decelerated.

6 Claims, 9 Drawing Sheets

FOREIGN PATENT DOCUMENTS

| | | |
|---|---|---|
| JP | 5-208663 A | 8/1993 |
| JP | 9-50597 A | 2/1997 |
| JP | 10-172100 A | 6/1998 |
| JP | 10-329684 A | 12/1998 |
| JP | 11048827 A * | 2/1999 |
| JP | 2001-114082 A | 4/2001 |
| JP | 2001-315626 A | 11/2001 |
| JP | 2002-274345 A | 9/2002 |
| JP | 2003-267085 A | 9/2003 |
| JP | 2004-123081 A | 4/2004 |

* cited by examiner

CONTROL DEVICE FOR AUTOMOBILE

TECHNICAL FIELD

This invention relates to an automatic control device for an automobile, and more particularly to a deceleration device for decelerating the speed of a vehicle.

BACKGROUND ART

There has been reduced to practice an inter-vehicle distance control device which measures the actual distance between the vehicle of a certain driver and a preceding vehicle by a driving environment sensor such as a laser instrument, determines a target inter-vehicle distance on the basis of the measured actual inter-vehicle distance and the speed of the vehicle of the driver, and controls the speed of the driver's vehicle in such a manner that the actual inter-vehicle distance may coincide with the target inter-vehicle distance.

Such an inter-vehicle distance control device controls the speed of the driver's vehicle so as to make the actual inter-vehicle distance coincident with the target inter-vehicle distance when the driving environment sensor detects the existence of a preceding vehicle, but controls the speed of the driver's vehicle so as to settle it to a preset speed when the driving environment sensor detects no preceding vehicle. However, since the preset speed is usually the upper limiting speed given by the control device installed on the driver's vehicle irrespective of whether there is a preceding vehicle or not, the driver's vehicle is necessarily accelerated to the preset speed whenever the driving environment sensor detects no preceding vehicle.

It often happens that the driving environment sensor fails to detect a human being or a physical object moving on the road such as a walking person or a running bicycle, or that it fails to correctly detect the road conditions such as sharp curves or intersections.

Accordingly, if such an inter-vehicle distance control device as described above is used on a vehicle driving along any road other than an automobile road dedicated to automobiles alone, such as a freeway or an express way, the vehicle may sometimes be accelerated even when a man or a bicycle is ahead of the vehicle, or even when the vehicle is entering a sharp curve or an intersection, provided that the driving environment sensor detects no preceding vehicle. For this reason, the inter-vehicle distance control device is so designed that it cannot be used on any road other than the road dedicated to automobiles alone.

As a result, in a driving environment where the inter-vehicle distance control device can be effectively used, it enables the driver to drive with less fatigue and higher security, but since it cannot be used in most driving environments, it hardly benefits the driver even if it, which is usually expensive, is installed on the driver's vehicle.

To overcome this shortcoming, there have been proposed methods with which the inter-vehicle distance control device can be used in as many driving environments as possible.

For example, Japanese Patent document JP-A-9-50597 proposes a method according to which the vehicle speed is automatically decelerated when the vehicle is entering a curve, by the help of a car navigation system recognizing the road condition. According to JP-A-9-50597, however, the car navigation system has not reached a practical level where it can be used to assist the inter-vehicle distance control device in recognizing the driving environment. For the GPS, which is incorporated in the car navigation system to locate the current position of the vehicle on which it is installed, does not have a precision high enough to correctly show the road on which the vehicle is traveling, or the maps included in the navigation system may possibly indicate road shapes different from the actual ones.

In addition, various researches have been made for the effective detection of a human being or a bicycle, but no practical method has been found yet.

The inter-vehicle distance control device is a device which automates the operations of both the acceleration pedal and the brake pedal, but a method has been proposed wherein only the operation of the brake pedal is automated so as to alleviate the burden on the driver as much as possible in such a situation as described above.

For example, Japanese Patent document JP-A-10-172100 discloses an inter-vehicle distance control device which detects the distance between the driver's vehicle and a preceding vehicle by using a radar and performs only deceleration control for decelerating the speed of the driver's vehicle on the basis of the detected inter-vehicle distance when there is no actuation of acceleration pedal by the driver. With this control device, the driver's vehicle can be prevented from being dangerously accelerated when a human being or a bicycle is ahead of it. This control device, therefore, can be used on a road other than express ways or freeways and can also contribute very much to the mitigation of the fatigue and the improvement in the security, of the driver.

Further, Japanese Patent document JP-A-10-329684 disclosed a method which serves to decrease the frequency of the driver's braking actions through the automatic application of the brake while there is no actuation of accelerator pedal by the driver.

However, according to the teaching of JP-A-10-172100, the driver's vehicle continues its free running while the radar does not detect any obstruction ahead. Consequently, the driver's braking action my be retarded in case where the radar fails to detect an obstacle, contrary to the driver's erroneous conviction that the radar can detect any obstacle and lead to braking action.

Further, the method proposed by JP-A-10-329684 has the following problem. Namely, the method works usefully when there is a vehicle running ahead of the driver's vehicle. However, when there is a preceding vehicle and also when the preceding vehicle is decelerated at a deceleration greater than the deceleration at which the driver's vehicle is automatically decelerated through automatic braking, the driver must additionally apply the brake. On the other hand, when the deceleration of the preceding vehicle is lower than the deceleration at which the driver's vehicle is automatically decelerated, the deceleration of the driver's vehicle must be controlled by alternating the accelerating action by stepping on the accelerator pedal and the decelerating action through the automatic braking.

DISCLOSURE OF INVENTION

This invention, therefore, is characterized by comprising a recognition section for recognizing driving environment; a first target-deceleration calculating section for obtaining a target deceleration depending on the recognized driving environment; a second target-deceleration calculating section for obtaining a target deceleration irrespective of the recognized driving environment; and a switching section for selecting between the target deceleration obtained depending on the recognized driving environment and the target deceleration obtained irrespective of the recognized driving environment, on the basis of vehicle information including the recognized driving environment.

Thus, according to the decelerating device of this invention, the driver's vehicle can be decelerated even when the recognition section for recognizing the driving environment fails to detect an obstacle existing ahead of the driver's vehicle, and further the occurrence of a dangerous situation that may result from the driver's delayed application of the brake can be prevented even when the recognition section fails to detect such an obstacle contrary to the driver's false conviction that the vehicle is automatically decelerated.

BEST MODE FOR CARRYING OUT THE INVENTION

This invention is now described in detail with reference to the attached drawings.

Embodiment 1

The structure of a system installed on a vehicle is described with reference to FIG. 1.

Figure 1:
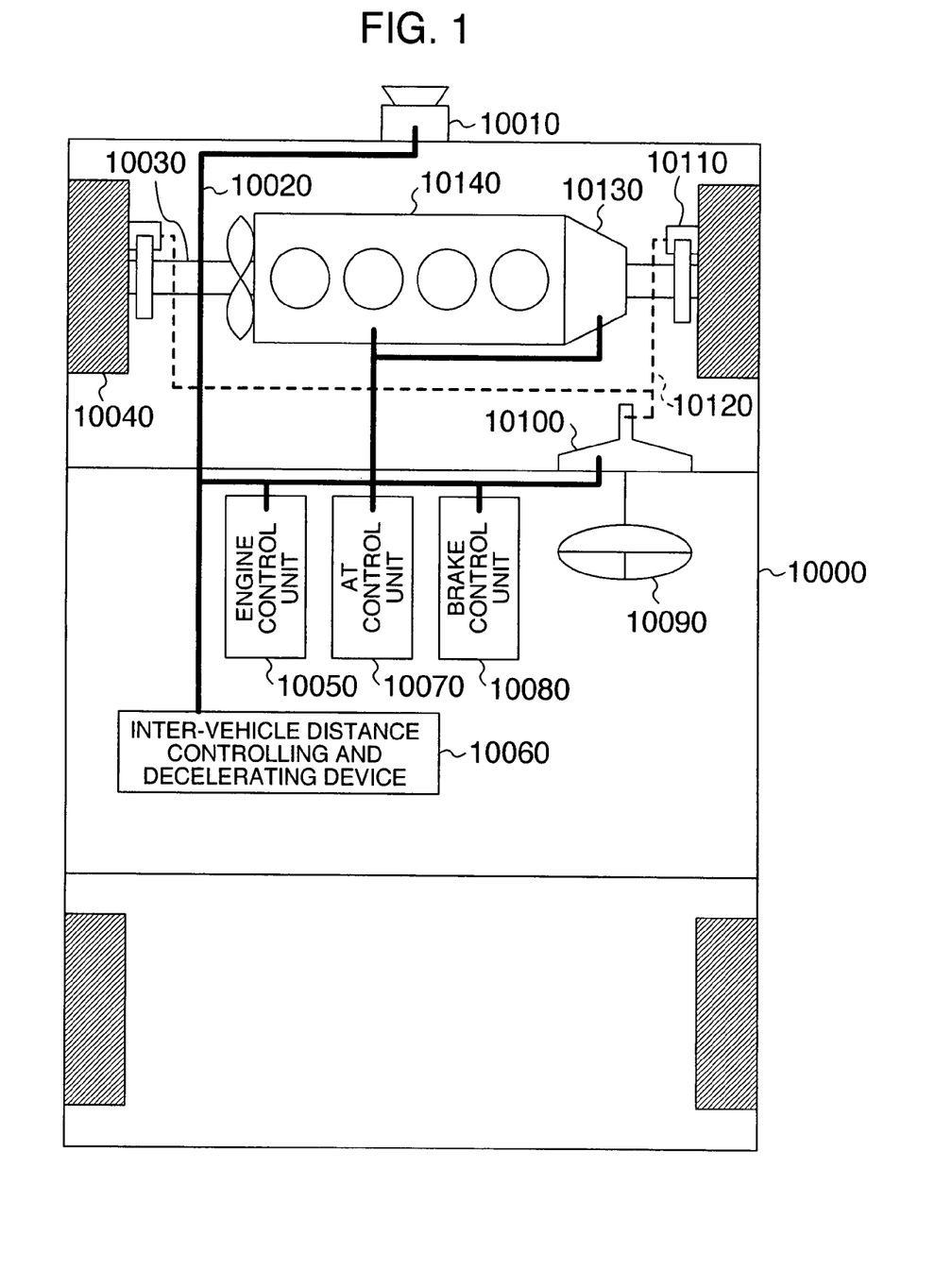
FIG. 1 schematically shows the structure of a vehicle system.

To begin with, the components of the structure shown in FIG. 1 are explained. Reference numeral 10010 indicates a radar for measuring the inter-vehicle distance between this vehicle and a preceding vehicle. This radar can be replaced by other sensors such as cameras if the sensors can detect the position of and recognize the shape of, a preceding vehicle or an obstacle. Numeral 10020 designates a wire harness assembly for connecting the sensors and various units with actuators; 10030 a drive shaft for transmitting driving force from en engine 10140 to tires 10040; 10040 tires; 10050 an engine control unit for controlling an engine; 10060 an inter-vehicle distance controlling and decelerating device for controlling the deceleration of the vehicle depending on the inter-vehicle distance measured by the radar 10020; 10070 an AT (automatic transmission) control unit for controlling an automatic transmission mechanism; 10080 a brake control unit for controlling the operation of the brake; 10090 a steering wheel; 10100 a brake booster for enhancing the force with which the brake pedal is actuated; 10110 a brake assembly consisting of a brake caliper and a brake disc; 10120 a pipe line for conducting brake fluid which transmits driving force to the brake; 10130 a transmission assembly; and 10140 an engine.

FIG. 1 shows an automobile whose prime mover is an internal combustion engine, but this invention can equally be applied to an automobile driven by an prime mover other than an internal combustion engine, such as, for example, an electric motor. The brake system shown in FIG. 1 uses oil pressure, but an electrically driven brake system using driving power generated by an electric motor can also be employed.

The whole information mentioned in the following description, including controlled variables, physical quantities and parameters, is sent and received as electric signals between the control device and various processing means including the above mentioned components. These signals can be sent and received through not only signal wires but also wireless channels using communication protocols.

Now, the operation of the inter-vehicle distance controlling and decelerating device 10060 will be described. The inter-vehicle distance controlling and decelerating device 10060 calculates a target brake-fluid pressure and then sends the calculated target brake-fluid pressure to the brake control unit 10080 so that the inter-vehicle distance measured by the radar 10010 may coincide with the target inter-vehicle distance calculated in the inter-vehicle distance controlling and decelerating device 10060 or so that the vehicle of interest may be decelerated when it needs to be decelerated. Here, the controlled variable sent to the brake control unit 10080 is the brake-fluid pressure, but this controlled variable can be the driving shaft torque or the acceleration which is another controlled variable for controlling the speed of the vehicle. Upon receiving the target brake-fluid pressure, the brake control unit 10080 controls the brake booster 10100 so that the brake-fluid pressure throughout the pipe line 10120 may coincide with the target brake-fluid pressure.

Further, the inter-vehicle distance controlling and decelerating device 10060 may vary the gear position in the transmission 10130 by sending the target gear position signal to the AT control unit 10070, or may purposefully generate engine braking by sending the throttle full-closure signal or the fuel cut signal to the engine control unit 10050.

As described above, the inter-vehicle distance controlling and decelerating device 10060 can control the vehicle on which it is installed, in decelerating depending on the driving environment of the vehicle.

The structure of the inter-vehicle distance controlling and decelerating device 10060 will now be described below.

Figure 2:
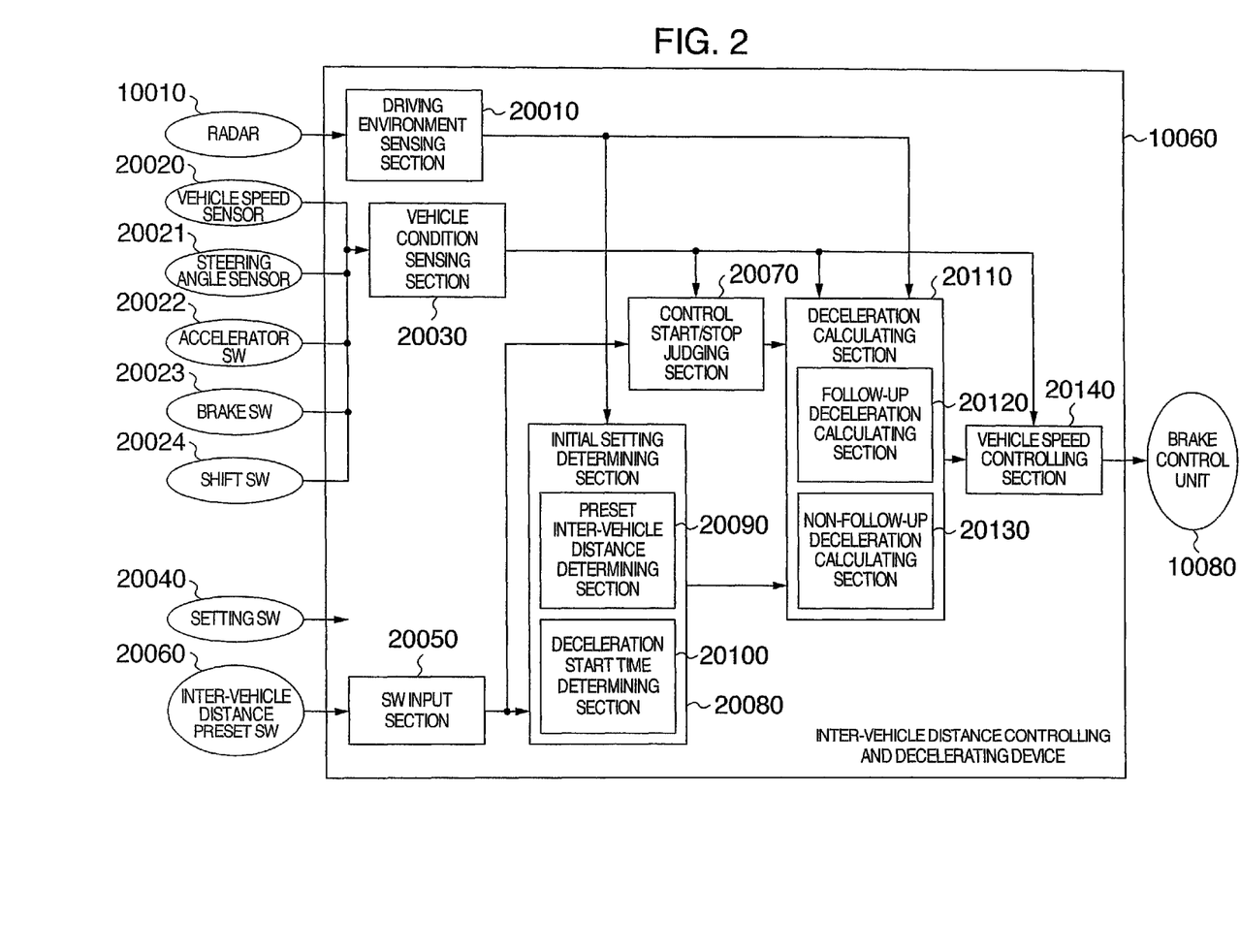
FIG. 2 shows in block diagram the internal structure of an inter-vehicle distance control device.

FIG. 2 shows in block diagram the structure of the inter-vehicle distance controlling and decelerating device 10060. A driving environment sensing section 20010 processes the data received from the radar 10010 and outputs the distance from the radar to an obstacle, the relative speed and the angle (plus other parameters), of the obstacle. The processing of the input from the radar by the driving environment sensing section 20010 includes the bit rate transformation of the inputted data, the limiting treatment, the offset treatment and the sign inversion. Depending on the characteristic of the radar, it may further include the filtering treatment for cutting noise. In this embodiment, the radar 10010 is connected with the driving environment sensing section 20010, but instead the radar 10010 may also be connected with another sensor capable of recognizing the driving environment, such as, for example, a camera.

Thus, the information on the driving environment is outputted and this information may further include the information on whether the driving environment is recognized or not. Or alternatively, the former information and the latter information may be outputted separately. A vehicle condition sensing section 20030 processes the outputs from a vehicle speed sensor 20020, a steering angle sensor 20021, an accelerator SW 20022, a brake SW 20023 and a shift SW 20024. The vehicle condition sensing section 20030 outputs in turn signals indicative of the speed of the vehicle, the acceleration of the vehicle, whether or not the driver is manipulating the steering wheel, whether or not the driver is actuating the accelerator pedal, whether or not the driver is actuating the brake pedal, and whether or not the shift lever of the transmission is in the "reverse" position.

Thus, the vehicle information including the information on the driving environment can be outputted. Further, as a matter of course, only the information on the driving information can be outputted. The vehicle information can be calculated/processed as follows, but can also be obtained through other procedures.

The speed of the vehicle in consideration is calculated depending on the signal outputted from the vehicle speed sensor 20020, representing 2π×tire radius×rotation speed of the wheel. In this case, depending on the characteristic of the vehicle speed sensor, a filtering step may be added to cut noise.

The acceleration of the vehicle is obtained by differentiating the calculated vehicle speed, but may also be directly measured by the use of a G (gravity) sensor.

The fact that the driver is manipulating the steering wheel can be judged according as the steering angle sensor 20021 continues to detect steering angles exceeding a predetermined threshold for a certain period of time. The same fact may also be judged, for example, according as the yaw rate sensor installed on the vehicle continues to detect yaw rates exceeding a predetermined threshold for a certain period of time.

The accelerator is deemed to be actuated or not to be actuated by the driver according as the accelerator SW 20022 is turned on or remains off. Alternatively, a sensor/SW other than the accelerator SW may be connected with the vehicle condition sensing section 20030. In such a case, the accelerator may be deemed to be actuated by the driver when the accelerator opening detected by the accelerator opening sensor exceeds a certain threshold or when the throttle opening detected by the throttle opening sensor exceeds a certain threshold.

The brake is deemed to be actuated or not to be actuated according as the brake SW 20023 is turned on or it remains off. Alternatively, a sensor/SW other than the brake SW 20023 may be connected with the vehicle condition sensing section 20030. In such a case, the brake may be deemed to be actuated by the driver, for example, when the brake fluid pressure exceeds a certain threshold, when the depressing force detected by the depressing force sensor attached to the brake pedal exceeds a certain threshold, or when the stroke detected by the stroke sensor attached to the brake pedal exceeds a certain threshold.

Whether or not the shift lever of the transmission is in the reverse position can be judged by monitoring the signal for lighting the backup lamp of the shift SW. For example, if the backup lamp lighting signal is in the "on" state, the shift lever is deemed to be in the reverse position.

An SW input section 20050 inputs and processes the signals from a setting SW 20040 and an inter-vehicle distance preset SW 20060, and further judges whether the setting SW 20040 is turned on by the driver and whether the inter-vehicle distance preset SW 20060 remains in the "on" state. The fact that the setting SW is turned on by the driver is ascertained when the setting SW 20040 continues to be in the "on" state for longer than a certain period of time. The fact that the inter-vehicle distance preset SW 20060 is turned on by the driver is also judged by the same procedure as taken for the setting SW 20040.

Further details will described below.

A control start/stop judging section 20070 determines states of control depending on the vehicle condition obtained from the vehicle condition sensing section 20030 and the SW condition obtained from the SW input section 20050. How the states of control mentioned above are selected is described with reference to FIG. 3.

Figure 3:
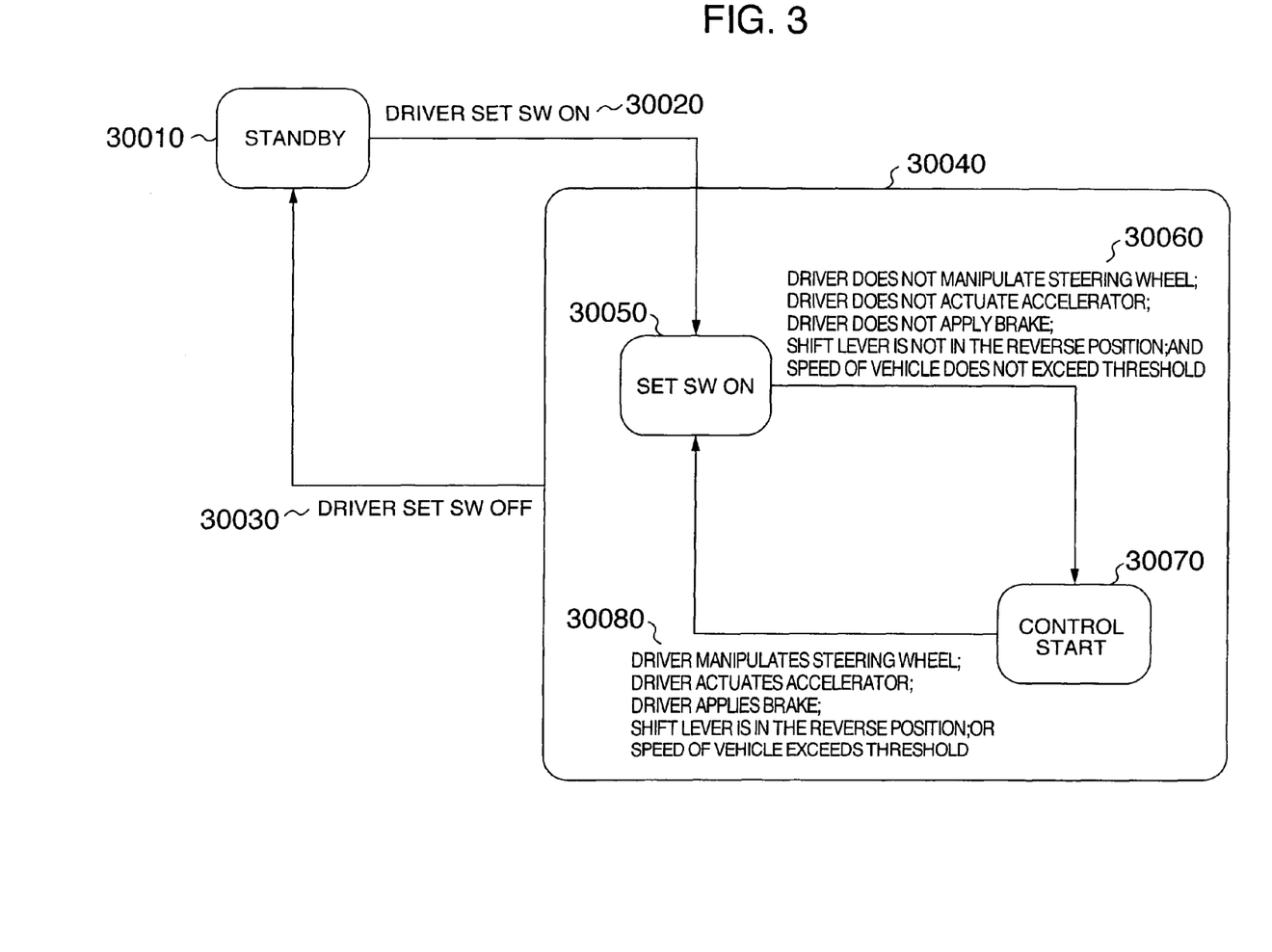
FIG. 3 schematically shows the state transitions taking place in a control start/stop judging section.

When the ignition switch IGN of the vehicle is turned on, the state of control is the state of standby 30010. When the setting SW 20040 is turned on in the standby state 30010, that is, when the state 30020 of driver set SW getting turned on occurs, the state 30050 of the setting SW being on is reached. In this state 30050 of the setting SW being on, when the states 30060 occur that the driver does not manipulate the steering wheel, that the driver does not actuate the accelerator, that the driver does not apply the brake, that the shift lever is not in the reverse position, and that the speed of the vehicle does not exceed the threshold, then the state 30070 of control start is reached. In the state 30070 of control start, when the state 30080 occurs that the driver manipulates the steering wheel, that the driver actuates the accelerator, that the driver applies the brake, that the shift lever is in the reverse position, or that the speed of the vehicle exceeds the threshold, then the state 30050 of the setting SW being on is reached. In the state 30050 of the setting SW being on or in the state 30070 of control start, when the state 30030 of the driver set SW getting turned off occurs, the standby state 30010 is reached.

An initial setting determining section 20080 consists of a preset inter-vehicle distance determining section 20090 and a deceleration start timing determining section 20100.

Figure 4:
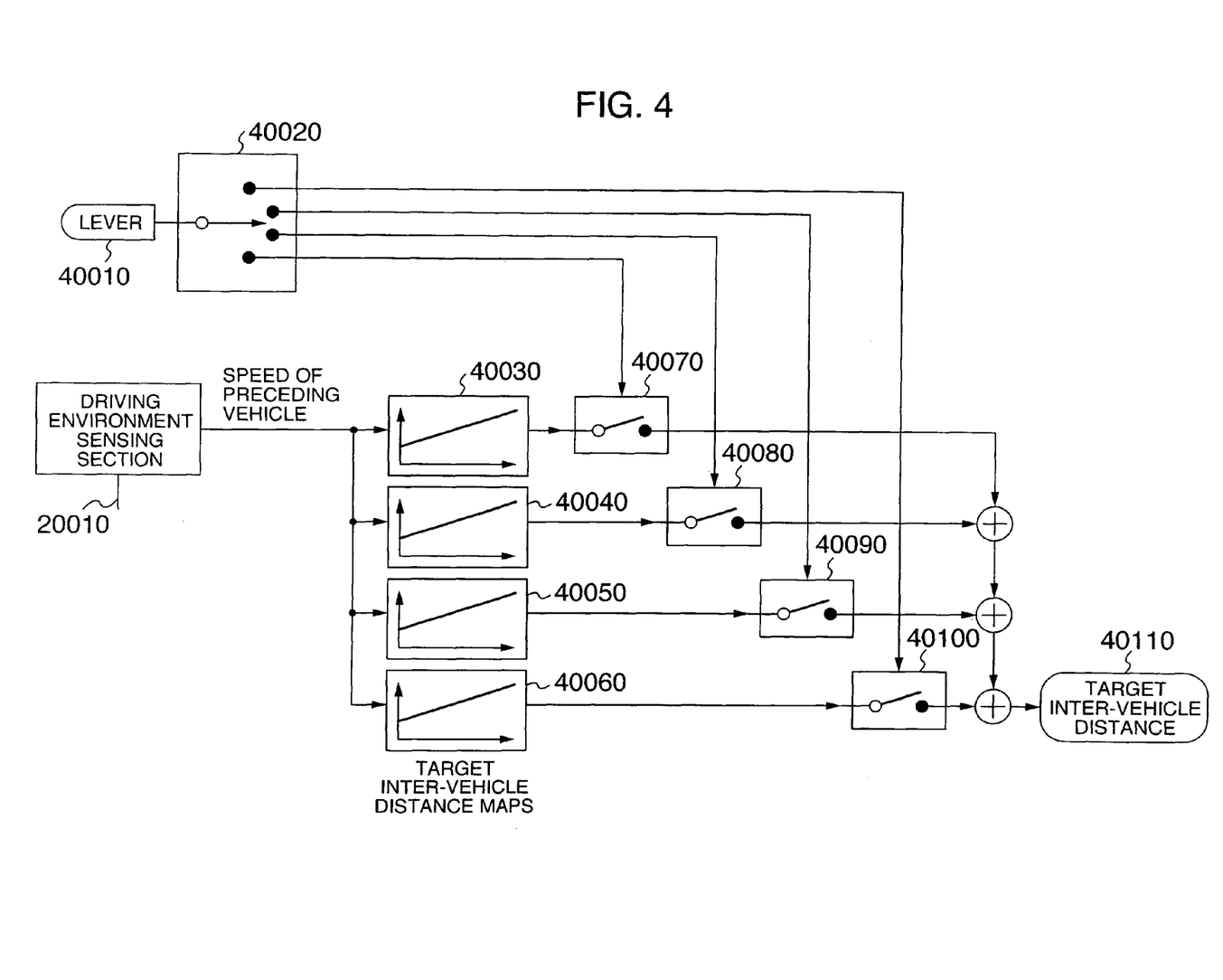
FIG. 4 shows in block diagram a target inter-vehicle distance determining section.

How the preset inter-vehicle distance determining section 20090 determines the preset inter-vehicle distance will be described with reference to FIG. 4.

Changing over the preset inter-vehicle distance SW 40020 by the driver manipulating the lever 40010 causes the switches SW's 40070-40100 to select the values of the target inter-vehicle distance maps 40030-40060, and the selected value is outputted as the target inter-vehicle distance 40110. The target inter-vehicle distance maps 40030-40060 are provided on the basis of the speeds of the preceding vehicles obtained from the driving environment sensing section 20010.

Figure 5:
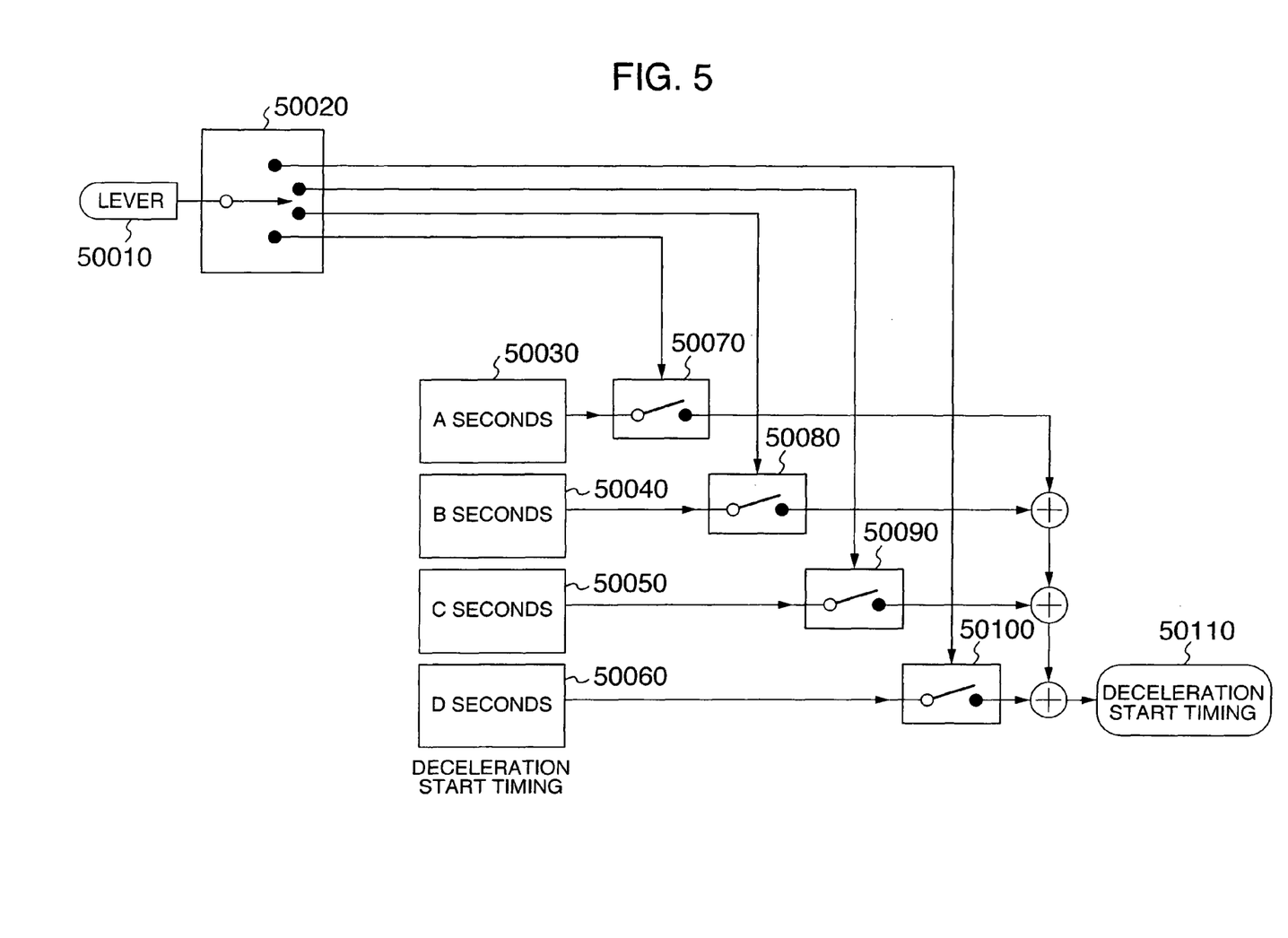
FIG. 5 shows in block diagram a deceleration start-timing determining section.

How the deceleration start timing determining section 20100 determines the deceleration start timing will be described with reference to FIG. 5.

Changing over the deceleration start timing selecting SW 50020 by the driver manipulating the lever 50010 causes the switches SW's 50070-50100 to select the values of the deceleration start timings 50030-50060, and the selected value is outputted as the deceleration start timing 50110.

A deceleration calculating section 20110 consists of a follow-up deceleration calculating section 20120 and a non-follow-up deceleration calculating section 20130. The operation of the deceleration calculating section 20110 will now be described with reference to FIG. 6, which shows the flow chart of the switching logic section for determining whether there is a preceding vehicle or not.

Figure 6:
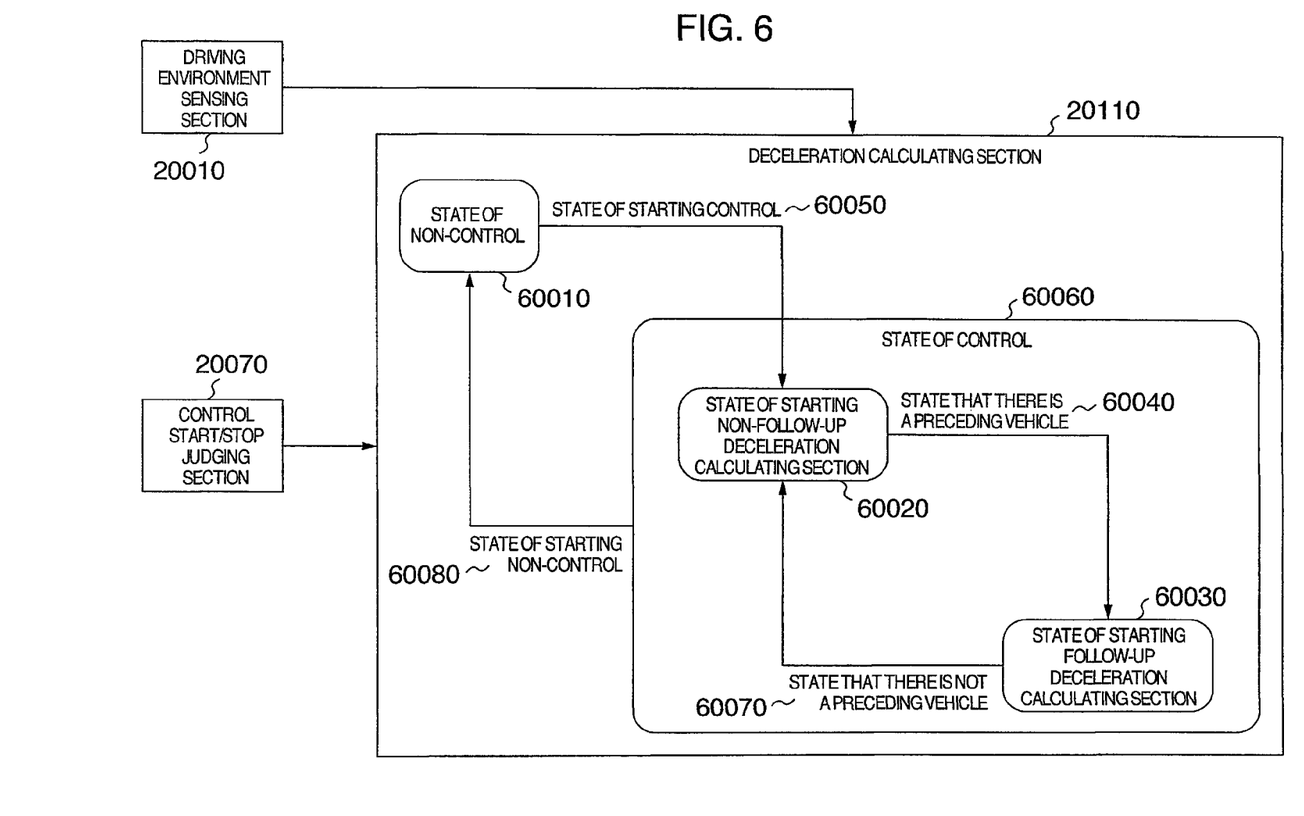
FIG. 6 schematically shows the internal state of a follow-up deceleration calculating section.

The deceleration calculating section 20110 is initially in the state of non-control 60010. In this state, when the output from the control start/stop judging section 20070 turns to the state 60050 of control start, the state 60060 of control is reached so that control is started. When the state of control 60060 is reached, the state 60020 of starting the non-follow-up deceleration calculating section 20130 is initially assumed. Under this condition, if the driving environment outputted from the driving environment sensing section 20010 gives the state 60040 that there is a preceding vehicle, the state 60030 of starting the follow-up deceleration calculating section 20120 is reached. In the this state 60030 of starting the follow-up deceleration calculating section, when the driving environment outputted from the driving environment sensing section 20010 changes to the state 60070 that there is no preceding vehicle, the state 60020 of starting the non-follow-up deceleration calculating section 20130 is reached.

Under any condition, when the output of the control start/stop judging section 20070 turns to the state 60080 of starting non-control, the state 60010 of non-control is reached.

As described above, the non-follow-up deceleration calculating section 20130 starts its operation in the state 60020 of starting the non-follow-up deceleration calculating section 20130 while the follow-up deceleration calculating section 20120 starts its operation in the state 60030 of starting the follow-up deceleration calculating section 20120.

Figure 8:
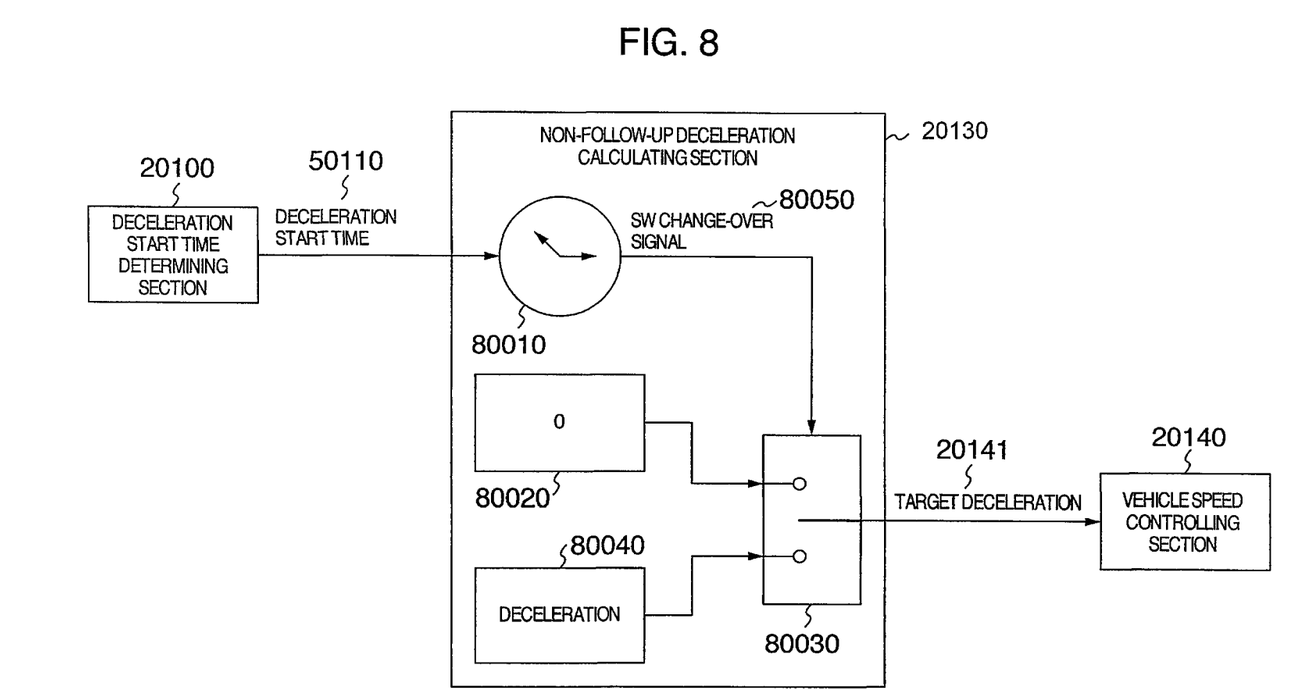
FIG. 8 shows in block diagram a non-follow-up deceleration calculating section.

The operation of the non-follow-up deceleration calculating section 20130 will be described with reference to FIG. 8.

Figure 7:
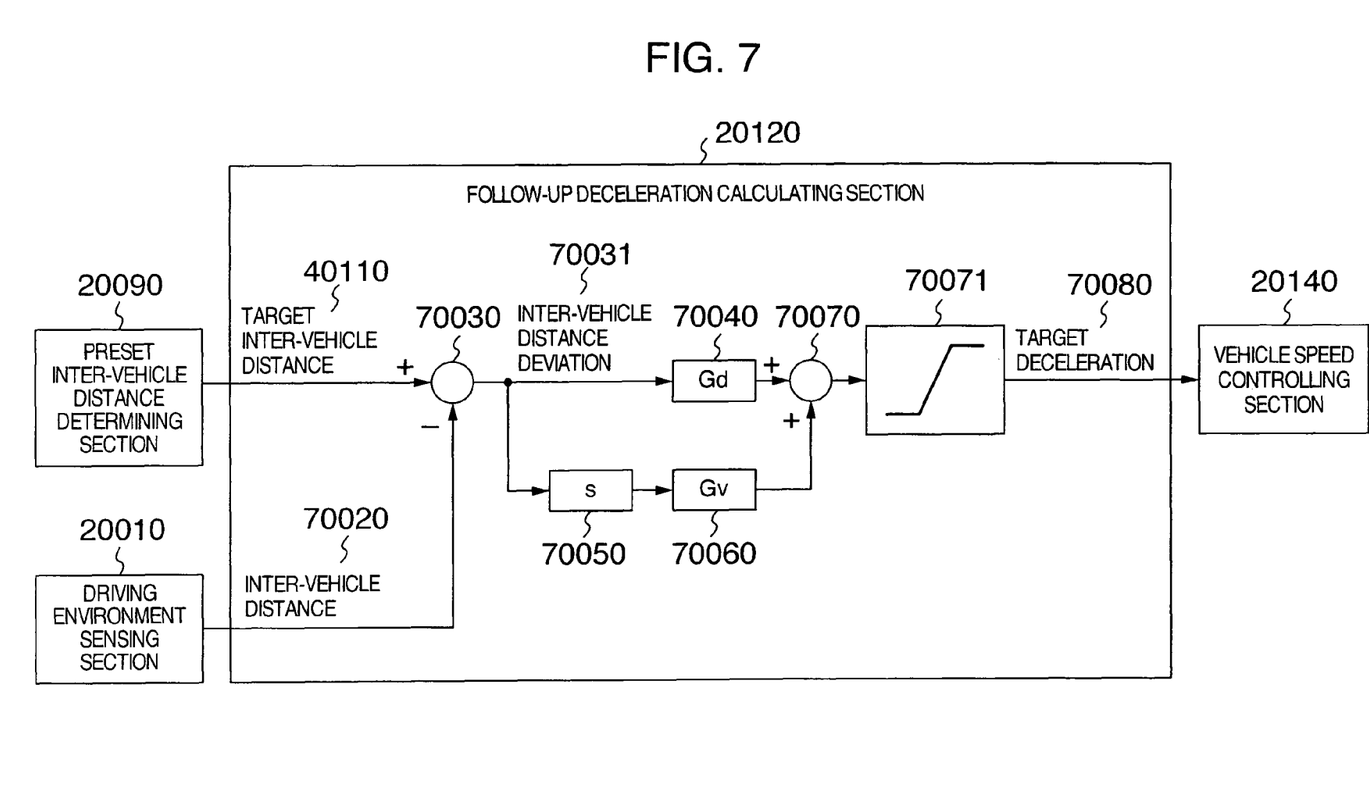
FIG. 7 shows in block diagram the follow-up deceleration calculating section.

The follow-up deceleration calculating section 20120 obtains the inter vehicle distance deviation 70031 by subtracting the actual inter-vehicle distance 70020 outputted from the driving environment sensing section 20010 from the target inter-vehicle distance 40110 outputted from the preset inter-vehicle distance determining section 20090. The value obtained by multiplying the inter-vehicle distance deviation 70031 by the gain Gd 70040 is added to the value obtained by differentiating the inter-vehicle distance deviation 70031 and multiplying the differentiated result 70050 by the gain Gv 70060. The sum is subjected to the limiting process 70071 in which the maximum acceleration that does not accelerate the vehicle is made the upper limit. The thus processed quantity is finally outputted as the target deceleration 70080.

The operation of the non-follow-up deceleration calculating section 20110 will be described with reference to FIG. 8.

The timer 80010 starts counting as soon as the non-follow-up deceleration calculating section 20130 is started up. After the start-up of the non-follow-up deceleration calculating section 20130, when a preset period of time, e.g. several seconds, has lapsed following the deceleration start timing 50110 determined by the deceleration start timing determining section 20100, the timer 80010 generates the SW change-over signal 80050, which changes over the deceleration change-over SW so that the deceleration 80040 is outputted as the target deceleration 20141. While the timer 80010 does not output the SW change-over signal 80050, the deceleration "0" 80020 is outputted as the target deceleration 20141.

Alternatively, the above mentioned SW change-over signal 80050 may be outputted when the vehicle speed outputted from the vehicle condition sensing section 20030 falls below a certain threshold, or when the probability of detecting the existence of a preceding vehicle, which is outputted from the driving environment sensing section 20010, exceeds a certain threshold.

In any case, selection is made between the use of the target deceleration derived on the basis of the information on the driving environment or the driving environment recognition and the use of the target deceleration derived irrespective of the driving environment information and so forth, by, for example, generating the SW change-over signal depending on the comparative reference to a preset value or range or through reference to data listed in a desired data table according to the information on the driving environment or the driving environment recognition.

Figure 9:
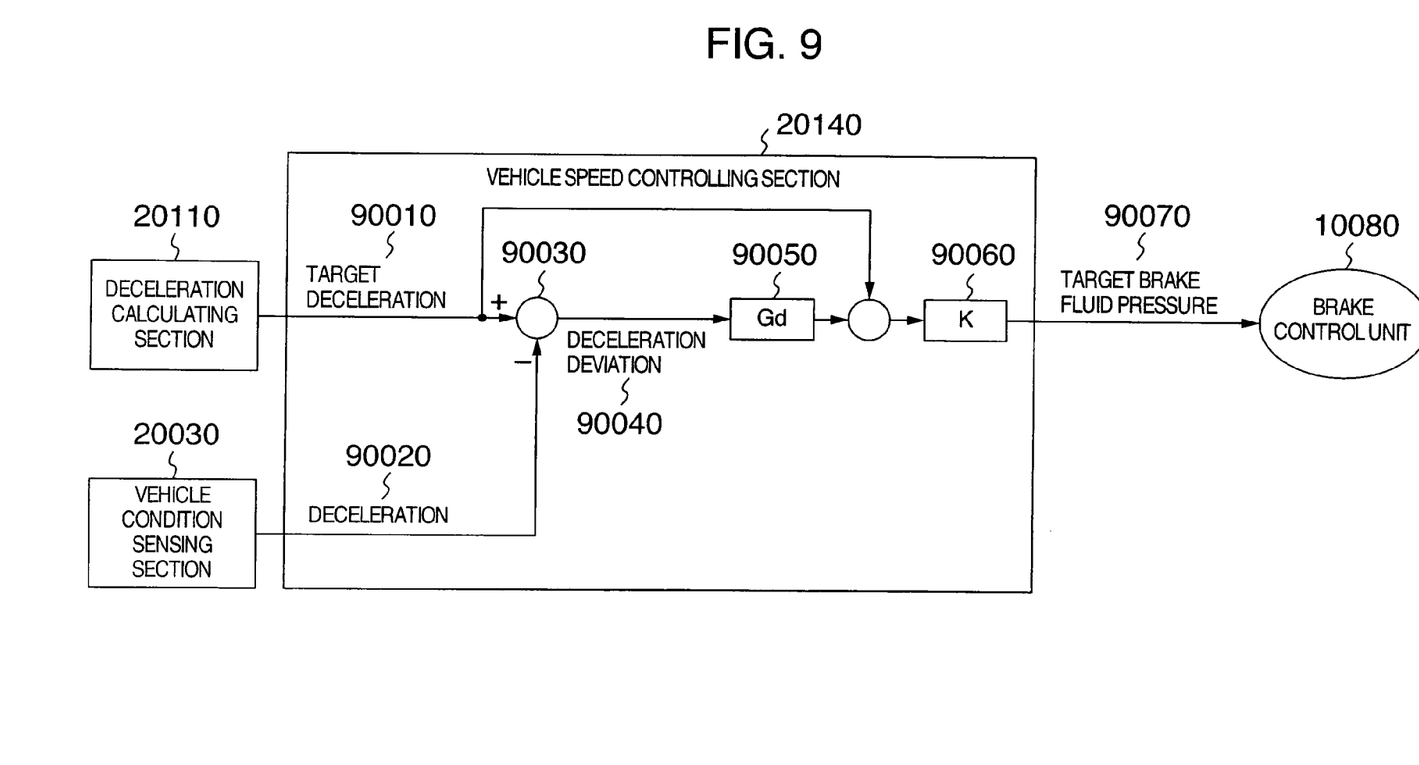
FIG. 9 shows in block diagram a vehicle speed control section.

The vehicle speed controlling section 20140 calculates the deceleration deviation 90040 (FIG. 9) by subtracting the deceleration 90020 outputted from the vehicle condition sensing section 20030 from the target deceleration 90010 outputted from the deceleration calculating section 20110. The calculated deceleration deviation 90040 is then multiplied by the gain Ga 90050, and the product is added to the deceleration deviation 90010. The sum is then multiplied by the constant K 90060 calculated on the basis of the vehicle weight, the brake pad p, the brake rotor radius, the brake pad area and the brake piston area, so that the target brake fluid pressure 90070 is obtained.

This invention or the embodiment of this invention comprises the driving environment recognizing section such as a sensor for sensing the driving environment; the first target deceleration calculating section for obtaining the target deceleration depending on the recognized driving environment, provided in the deceleration calculating section used in, for example, the inter-vehicle distance controlling and decelerating device; the second target deceleration calculating section for obtaining the target deceleration irrespective of the driving environment; and the change-over section for switching between the deceleration obtained depending on the driving environment and the deceleration obtained irrespective of the driving environment, on the basis of the vehicle information including the recognized driving environment.

Through the automatic brake control according to this invention, the driver's vehicle can be decelerated according to the deceleration of the preceding vehicle while the driver's radar is detecting the preceding vehicle, and even when the radar fails to detect the preceding vehicle, the driver's vehicle can be decelerated on the assumption that the driver is eager to apply the brake, if the driver does not actuate the accelerator. Thus, the above described automation of the brake operation can contribute much to the alleviation of the burden on the driver.

INDUSTRIAL APPLICABILITY

This invention can be applied not only to the control of vehicle speed but also to the safety device such as an anti-collision device for preventing collisions due to a driver's careless driving.

The invention claimed is:

1. A deceleration device for a vehicle, comprising:
a recognizing section for recognizing the driving environment including a preceding vehicle;
a first target deceleration calculating section operatively configured to obtain a first target deceleration depending on the recognized driving environment;
a second target deceleration calculating section operatively configured to obtain a predetermined second target deceleration at a condition that the recognizing section detects no preceding vehicle ahead of the vehicle;
a deceleration calculating section operatively configured to selectively output one of the first target deceleration from the first target deceleration calculating section and the second target deceleration from the second target deceleration calculating section, such that when the recognizing section detects the preceding vehicle in a state that the second target deceleration calculating section is in operation, the first target deceleration calculating section is made to be in operation to output the first target deceleration, and when the recognizing section detects no preceding vehicle in a state that the first target deceleration calculating section is in operation, the second target deceleration calculating section is made to be in operation to output the second target deceleration; and
a vehicle speed controlling section which generates a brake-fluid pressure signal for controlling the deceleration of the vehicle on the basis of one of the first target deceleration and the second target deceleration output from the deceleration calculating section, wherein the second target deceleration output from the second target deceleration calculating section is set to a predetermined value when the vehicle speed of the vehicle is net lower than a predetermined threshold value, and set to zero when the vehicle speed of the vehicle is not lower than the predetermined threshold value.

2. A deceleration device as claimed in claim 1, wherein the vehicle speed controlling section does not effect the deceleration when the shift lever for changing over a transmission is in a reverse position.

3. A deceleration device as claimed in claim 1, wherein the vehicle speed controlling section does not effect the deceleration when a steering angle of a steering wheel or a yaw rate of the vehicle exceeds a preset threshold.

4. A deceleration device as claimed in claim 1, wherein the vehicle speed controlling section does not effect the deceleration while a driver is actuating a brake.

5. A deceleration device as claimed in claim 1, wherein the vehicle speed controlling section does not effect the deceleration when the speed of the vehicle is outside a preset range.

6. A deceleration device as claimed in claim 1, wherein the first target deceleration calculating section controls the deceleration of the vehicle in such a manner that the minimum deceleration which prevents the vehicle from being accelerated becomes an upper limit.

\* \* \* \* \*